Dec. 10, 1968     O. S. SUTTER     3,415,018
GRID SUPPORTED CEILING LIGHTING FIXTURE
Filed Oct. 5, 1967     2 Sheets-Sheet 1
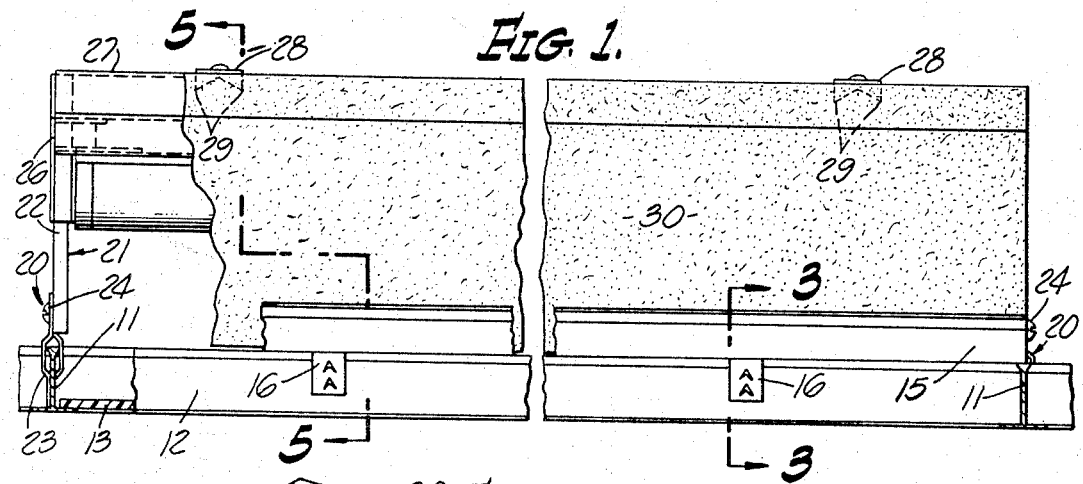
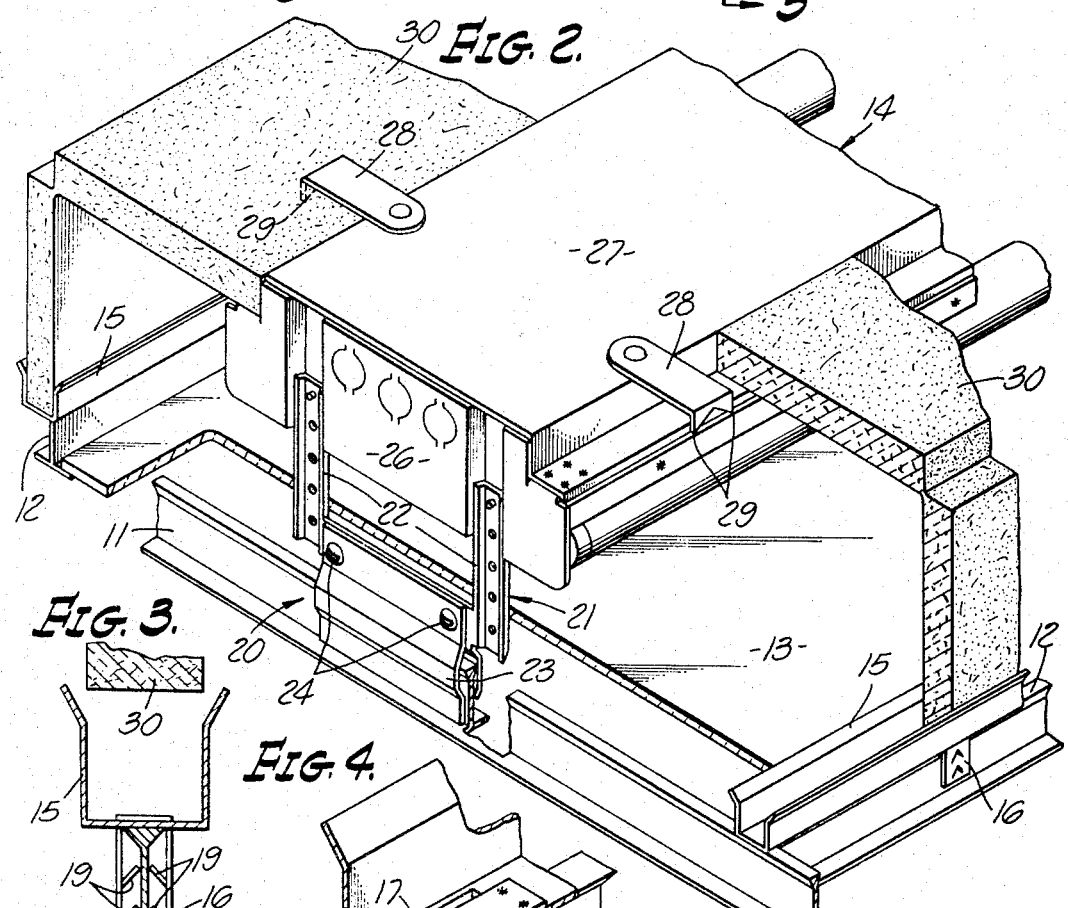
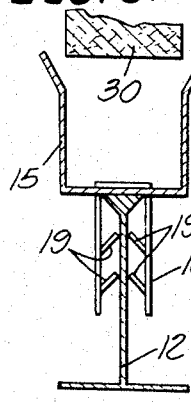
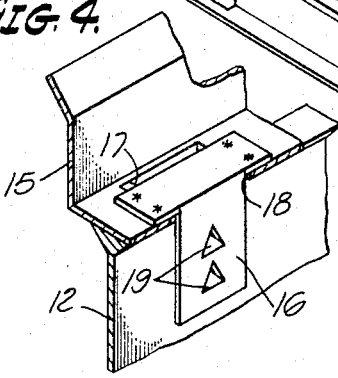
INVENTOR.
ORMOND S. SUTTER
BY Lyon & Lyon
ATTORNEYS Dec. 10, 1968  O. S. SUTTER  3,415,018
GRID SUPPORTED CEILING LIGHTING FIXTURE
Filed Oct. 5, 1967  2 Sheets-Sheet 2
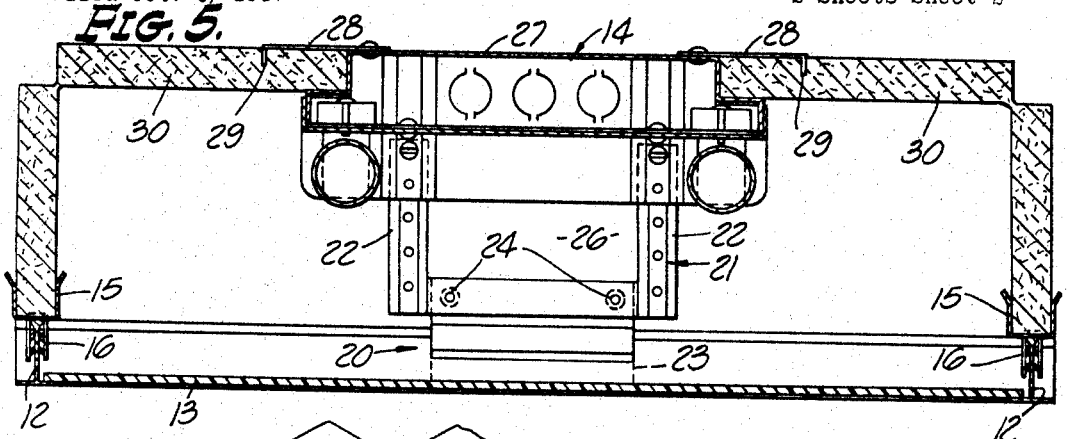
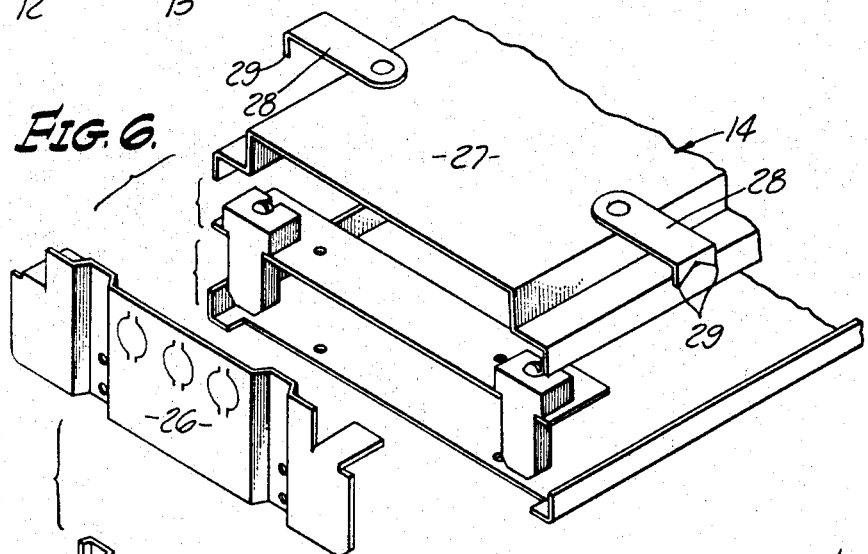
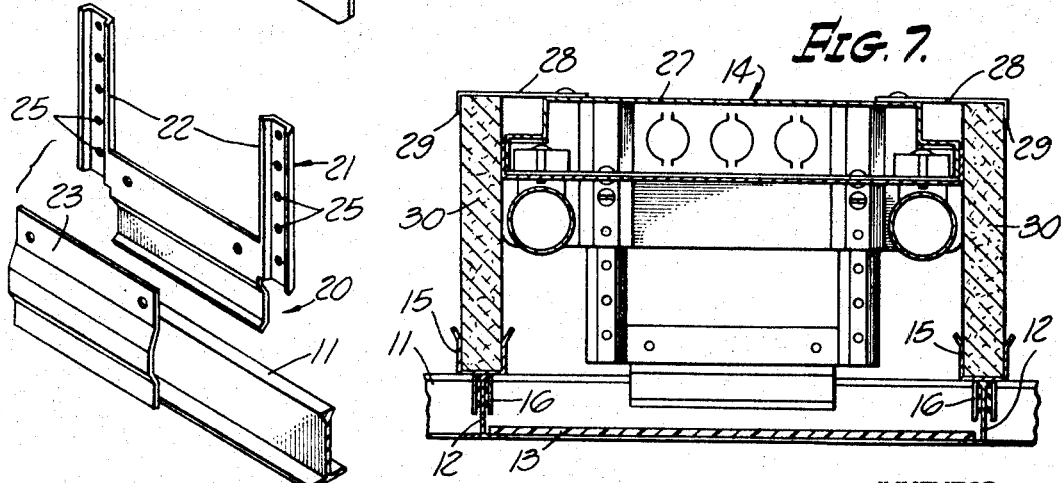
INVENTOR.
ORMOND S. SUTTER
BY
*Lyon & Lyon*
ATTORNEYS A United States Patent Office  3,415,018
Patented Dec. 10, 1968

3,415,018
GRID SUPPORTED CEILING LIGHTING FIXTURE
Ormond S. Sutter, Placentia, Calif., assignor to Lok-Products Co., Fullerton, Calif., a corporation of California
Filed Oct. 5, 1967, Ser. No. 673,184
10 Claims. (Cl. 52—28)

ABSTRACT OF THE DISCLOSURE

Supporting apparatus for mounting lighting fixtures in ceilings of the suspended grid type. Brackets are provided that can be fitted onto the grid members which extend parallel to the longitudinal axis of the lighting fixture and which also can be connected to the lighting fixture by a reflecting light shield. Other brackets are provided for connecting the light fixture to the grid members extending parallel to the lateral axis of the fixture.

Background of the invention

One of the more commonly used methods of installing a ceiling in industrial, commercial and residential buildings is to suspend a grid of angle members from the structural ceiling or roof of the building and then fill in the space between the grid members with lighting fixtures and with ceiling material such as acoustical tile. In some cases, the areas between the grid members are filled in with sheets of light transmitting material and the lighting fixtures positioned above these sheets.

In the past, the lighting fixtures generally have either been directly supported on the grid members with the diffusers of the fixtures serving as the light transmitting sheets or the fixtures have been suspended from the structural ceiling above the installed ceiling. In the first case, the grid structure has been limited to having a lateral distance between grid members on the same order as the width of the lighting fixtures and thus the nature and appearance of the ceiling must be designed around a parameter over which the designer has no real control. Furthermore, the lighting fixtures cannot be changed to a different type unless the new type has approximately the same lateral dimension as the old. In the second case, additional structure is required, thus increasing the cost. Moreover, problems of light shielding and lost illumination are raised by the fact that the fixtures are positioned a distance above the ceiling rather than almost flush with it.

Summary of the invention

According to the present invention, a supporting structure is provided that permits the use of a lighting fixture o fa given lateral dimension in a wide variety of grid structures, providing that the lateral dimension of the fixture is equal to, or less than, the lateral distance beteen the grid members. This is accomplished by providing bracket means that can be fitted onto the longitudinally extending grid members which are capable of supporting a reflecting light shield which is also attachable to the lighting fixture. Other brackets are provided for attachment to the laterally extending grid members and to firmly support the lighting fixture a desired distance above the grid structure. Light transmitting sheets or diffusers can then be laid directly on the flanges on the grid members and are independent of the light fixtures, thus simplifying maintenance.

It is therefore an object of the present invention to provide structure for mounting a lighting fixture in a suspended grid type ceiling.

Brief description of the drawings

FIGURE 1 is a side elevation, partly broken away, of the structure of the present invention;
FIGURE 2 is a perspective view, partly broken away, of the structure of the present invention;
FIGURE 3 is a cross-sectional detail view taken along the lines 3—3 of FIGURE 1;
FIGURE 4 is an enlarged perspective view, partly broken away, of a portion of the structure of the present invention;
FIGURE 5 is a sectional view taken along lines 5—5 of FIGURE 1;
FIGURE 6 is an exploded perspective view of the manner in which the end brackets are attached to the lighting fixture; and
FIGURE 7 is a cross-sectional view of a modification of the structure shown in the preceding figures.

Description of the invention

As can be seen from the several figures, the present invention is adapted to be used with a suspended grid type ceiling made up of laterally extending grid members 11 and longitudinally extending grid members 12. As shown, the grid members 11 are the main runners of the grid assembly while the members 12 are the cross runners, although this is not essential to the present invention. Both of the members 11 and 12 are angles having horizontally extending flanges at their base for supporting light transmitting sheets or diffusers 13 and sheets of any other ceiling material that may be desired. A light fixture 14 is positioned above the diffuser 13 in the manner to be described.

The longitudinally extending grid members 12 on either side of the lighting fixture 14 are each provided with a carrier channel 15 held in place on the respective grid member 12 by a bracket 16. The carrier channel 15 is generally U-shaped with its upper edges flaring outwardly and extends for substantially the entire length of the fixture 14. The base of the carrier channel 15 is provided with a pair of slots 17 and 18 which receive the legs of the generally U-shaped bracket 16. The base of the bracket 16 preferably lies flat on the base of the channel 15 and is spot-welded or otherwise attached thereto. The legs of the bracket 16 are preferably punched to form tangs 19 for grasping the upstanding leg of the grid member 12 in a spring-like manner.

The lighting fixture 14 is supported above the grid structure by end brackets 20 which are attached to the grid members 11. The end brackets 20 consist of a connector 21 having a pair of upstanding arms 22 and a plate 23. The base of the connector 21 and the plate 23 are fastened together on either side of the grid member 11 by bolts 24 and firmly grasp the member 11. The upstanding arms 22 of the conector 21 are provided with a series of holes 25 which enable these arms to be bolted to the end plate 26 of the lighting fixture 14 to support the lighting fixture the desired distance above the diffuser 13. The structure of the lighting fixture 14 is shown in an exploded perspective manner in FIGURE 6 to clarify the manner in which the connector 21 is fastened thereto; since the structure of the lighting fixture is conventional, no further explanation of it appears necessary here, except to note that the top plate thereof 27 is provided with a plurality of fastener arms 28 extending outwardly therefrom and being provided with depending teeth 29. While only two arms 28 are shown on each side of the fixture, it should be understood that in practice more or less could be used.

The depending teeth 29 of each of the arms 28 serve to firmly grasp one end of sheets of glass fiber 30 or the like that are creased or partially cut or scored an appropriate distance from the fixture 14 and then folded to assume a desired angle, for example, a right angle. The other ends of the sheets 30 are supported in their respective carrier channels 15. The sheets thus form a light shield and provide a reflecting surface. If desired, the end of the sheets 30 could be provided with tabs for insertion in the channel 15; in this event portions of the top of the channel 15 could be closed.

In the event that the longitudinal grid members 12 are relatively close together, sheets of glass fiber can be used without folding. This is shown in FIGURE 7 where like reference numerals are used for like elements. As can be seen in FIGURE 7, the depending teeth 29 of the arms 28 merely serve to hold the sheets 30 (which are not folded) in place. The sheets 30 abut against the enclosure plate 31 of the lighting fixture and thus a light shield is formed. In all other respects, the structure is identical to that described previously.

From the foregoing description, it can be seen that a structure has been provided for mounting a lighting fixture on the grid members of a suspended grid type ceiling even though the lateral members of the grid structure are spaced apart by a greater distance than the width of the lighting fixture. The structure also permits the lighting fixture to be detached from its associated diffuser so that the diffuser can be easily removed to permit maintenance or servicing of the lighting fixture. The structure of the present invention thus accords the designer of the ceiling a much wider choice than has previously been the case.

I claim:

1. Apparatus for supporting a lighting fixture on a first pair of members extending longitudinally with said lighting fixture and a second pair of members extending laterally to said lighting fixture comprising: first bracket means attaching one end of said lighting fixture to a first of said pair of laterally extending members; second bracket means attaching the other end of said lighting fixture to the other of said pair of laterally extending members; first channel means mounted on a first of said longitudinally extending members for a distance at least approximately equal to the length of said fixture, said first channel means having an opening at the top thereof; second channel means positioned on the other of said longitudinally extending members for a distance at least substantially equal to the length of said fixture, said second channel means having an opening at the top thereof; first fastener means positioned on one side of said lighting fixture; second fastener means positioned on the other side of said lighting fixture; a first sheet of material having one end positioned in said opening of said first channel means and the other end fastened to said first fastener means; and a second sheet of material having one end positioned in said opening of said second channel means and the other end fastened to said second fastener means.

2. The apparatus of claim 1 wherein said sheets of material are light blocking.

3. The apparatus of claim 2 wherein said sheets of material are light reflecting.

4. The apparatus of claim 1 wherein each of said channel means are mounted on their respective members by bracket means.

5. The apparatus of claim 4 wherein each of said channel means have a base, each of said bracket means comprising a U-shaped plate, the legs of said plate being passed through the base of its respective channel means and being provided with tangs for grasping its respective longitudinally extending member.

6. The apparatus of claim 1 where said fastener means each comprise at least one arm extending outwardly from said lighting fixture, said arm having a plurality of depending teeth.

7. The apparatus of claim 1 wherein said opening in each of said channel means extends the entire length thereof and wherein the entire end of said sheet of material is received therein.

8. The apparatus of claim 1 wherein said sheets of material are folded intermediate the ends thereof.

9. The apparatus of claim 1 wherein said end brackets each comprise a connector plate having upwardly extending arms for attachment to said lighting fixture and a second plate, said connector plate and said second plate being positioned on either side of their respective laterally extending member and firmly affixed thereto.

10. The apparatus of claim 6 wherein said other end of each of said sheets of material is held against said fixture by said depending teeth.

References Cited

UNITED STATES PATENTS

| | | | |
|---|---|---|---|
| 2,831,962 | 4/1958 | Winker et al. | 240—51.11 |
| 3,035,165 | 5/1962 | Trott | 240—78 |
| 3,051,430 | 8/1962 | Halfaker | 240—78 |
| 3,329,387 | 7/1967 | Fischer | 52—484 |

HENRY C. SUTHERLAND, *Primary Examiner.*

U.S. Cl. X.R.

240—9, 78; 52—484